US011905975B1

(12) United States Patent
Gaye et al.

(10) Patent No.: US 11,905,975 B1
(45) Date of Patent: Feb. 20, 2024

(54) RADIAL COMPRESSOR WITH LEADING EDGE AIR INJECTION

(71) Applicant: Hamilton Sundstrand Corporation, Charlotte, NC (US)

(72) Inventors: Ousmane Gaye, Hartford, CT (US); Viktor Kilchyk, Lancaster, NY (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 17/885,319

(22) Filed: Aug. 10, 2022

(51) Int. Cl.
F04D 29/58 (2006.01)
F04D 29/28 (2006.01)
F04D 17/06 (2006.01)
B33Y 80/00 (2015.01)
F04D 29/68 (2006.01)

(52) U.S. Cl.
CPC ........... F04D 29/684 (2013.01); F04D 17/06 (2013.01); F04D 29/284 (2013.01); F04D 29/5846 (2013.01); B33Y 80/00 (2014.12)

(58) Field of Classification Search
CPC .... F04D 29/5846; F04D 17/06; F04D 29/284; F04D 29/28; F04D 17/08; F04D 17/10; B33Y 80/00; F05D 2240/303; F05D 2260/202; F05D 2260/203
See application file for complete search history.

(56) References Cited

U.S. PATENT DOCUMENTS 4,807,433 A * 2/1989 Maclin .................... F01D 5/081
415/115
10,107,109 B2 10/2018 McCaffrey
2007/0296967 A1 * 12/2007 Gupta .................... G01J 3/2889
356/318
2011/0229351 A1 * 9/2011 Beers ...................... F04D 29/58
417/372
2015/0143695 A1 5/2015 Musgrove et al.
2018/0056396 A1 * 3/2018 Menon .................... B33Y 40/20
2018/0066525 A1 * 3/2018 Downs .................... F01D 5/186
2021/0102492 A1 * 4/2021 Rambo ...................... F02C 3/22

OTHER PUBLICATIONS

Ghorab (Film cooling effectiveness and heat transfer analysis of a hybrid scheme with different outlet configurations), Applied Thermal Engineering, Oct. 2013, pp. 205 and 216 (Year: 2013).*
Jiang et al., Multi-step optimizations of leading edge and downstream film cooling configurations on a high pressure turbine vane, Applied Thermal Engineering, Feb. 2018, pp. 205-208 (Year: 2018).*
Extended European Search Report dated Dec. 14, 2023, for corresponding European Application No. 23189064.1.

* cited by examiner

Primary Examiner — Mark A Laurenzi
Assistant Examiner — Xiaoting Hu
(74) Attorney, Agent, or Firm — Kinney & Lange, P.A.

(57) ABSTRACT

A compressor includes a housing and a mixed-flow rotor mounted within the housing. The mixed-flow rotor includes a blade and a rotor hub with an interior flow passage. The blade includes an internal channel between a pressure surface and a suction surface of the blade. The internal channel extends radially within the blade and is in fluidic communication with the interior flow passage. The blade also includes a plurality of air outlets formed on the blade proximate a leading edge of the blade. The plurality of air outlets extends into the blade to fluidically connect with the internal channel.

19 Claims, 6 Drawing Sheets

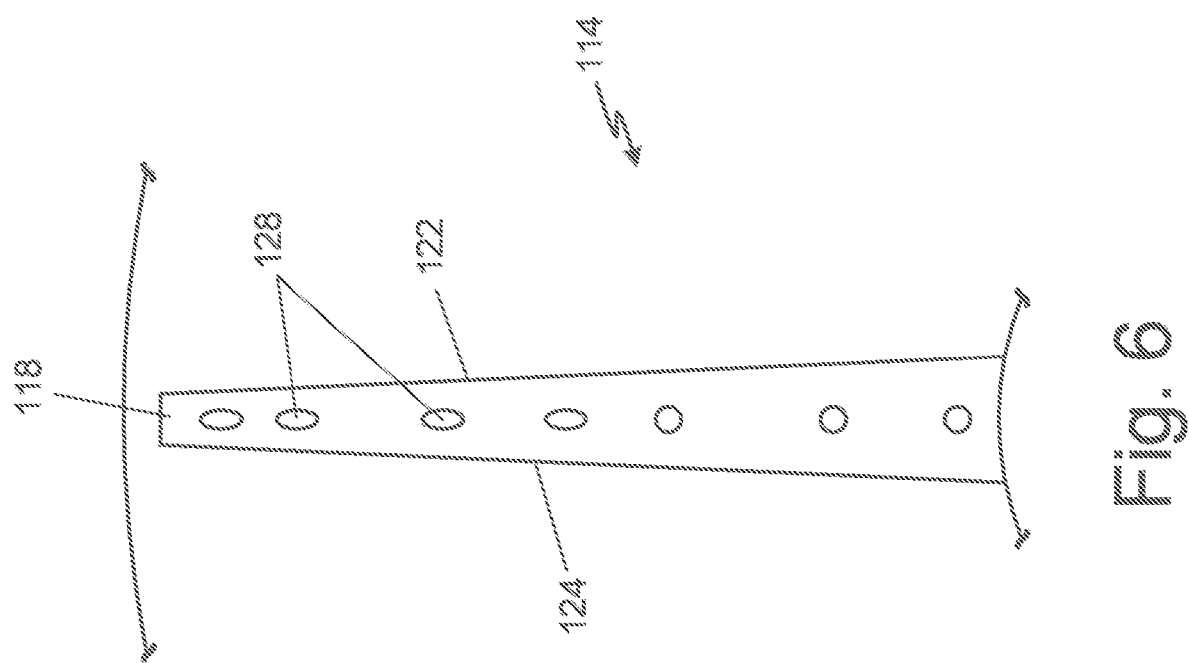

RADIAL COMPRESSOR WITH LEADING EDGE AIR INJECTION

CROSS-REFERENCE TO RELATED APPLICATION(S)

This application is related to U.S. application Ser. No. 17/885,318, filed on Aug. 10, 2022, entitled "LEADING EDGE AIR INLET FAN ROTOR", the disclosure of which is incorporated by reference in its entirety.

BACKGROUND

The present disclosure relates to compressors and, more specifically, flow dynamics of mixed-flow rotors within compressors.

A mixed-flow rotor is used within a compressor housing to circulate a working fluid. Efficient operation of the mixed-flow rotor is desirable to increase the efficiency of the overall compressor. As the working fluid passes over the rotor blade of the mixed-flow rotor the working fluid can separate from laminar flow over the blade and develop into turbulent flow near the blade. This flow separation and resultant turbulent flow reduces the efficiency of the overall compressor.

SUMMARY

In one aspect of the disclosure, a compressor includes a housing and a mixed-flow rotor mounted within the housing. The mixed-flow rotor includes a blade and a rotor hub with an interior flow passage. The blade includes a leading edge extending in a radial direction, trailing edge extending in an axial direction, a pressure surface extending from the leading edge to the trailing edge, and a suction surface extending from the leading edge to the trailing edge opposite the pressure surface. The blade also includes an internal channel inside the blade between the pressure surface and the suction surface. The internal channel extends radially within the blade and is in fluidic communication with the interior flow passage. The blade also includes a plurality of air outlets formed on the blade proximate the leading edge. The plurality of air outlets extends into the blade to fluidically connect with the internal channel.

In another aspect of the disclosure, an impeller includes a rotor hub with an interior flow passage and a blade. The blade includes a leading edge extending in a radial direction, trailing edge extending in an axial direction, a pressure surface extending from the leading edge to the trailing edge, and a suction surface extending from the leading edge to the trailing edge opposite the pressure surface. The blade also includes an internal channel inside of the blade between the pressure surface and the suction surface. The internal channel extends radially within the blade. The blade also includes a plurality of air outlets formed on the blade proximate the leading edge. The plurality of air outlets extends into the blade to fluidically connect with the internal channel.

In another aspect of the disclosure, a method of manufacturing a mixed-flow rotor, the method including additively manufacturing a rotor. The rotor includes a blade and a rotor hub with an interior flow passage. The blade includes a leading edge extending in a radial direction, a trailing edge extending in an axial direction, a pressure surface extending from the leading edge to the trailing edge, and a suction surface extending from the leading edge to the trailing edge opposite the pressure surface. The blade further includes an internal channel inside the blade between the pressure surface and the suction surface. The internal channel extends radially within the blade and is in fluidic communication with the interior flow passage. The blade also includes a plurality of air outlets formed on the blade proximate the leading edge. The plurality of air outlets extends into the blade to fluidically connect with the internal channel.

BRIEF DESCRIPTION OF THE DRAWINGS

FIG. 6 is a front elevation view of a blade with air outlets of varying spacing and profile on a leading edge of the blade.

DETAILED DESCRIPTION

Figure 1:
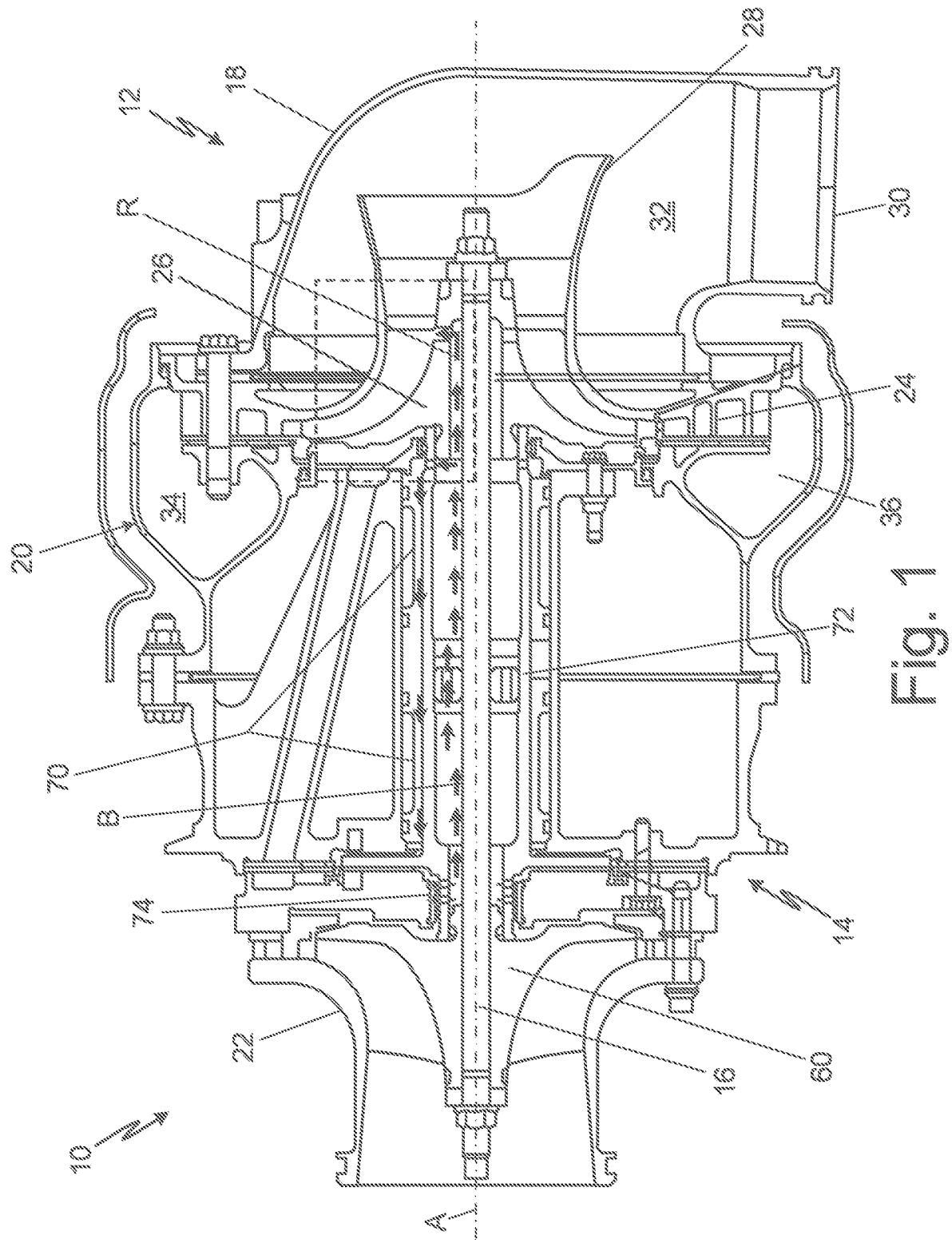
FIG. 1 is a cross-sectional view of an air cycle machine.

FIG. 1 is a cross-sectional view of air cycle machine 10. Air cycle machine 10 includes compressor section 12, turbine section 14, tie rod 16, compressor inlet housing 18, compressor outlet housing 20, turbine shroud 22, diffuser 24, mixed-flow rotor 26, and rotor shroud 28. Compressor inlet housing 18 includes inlet 30 and inlet duct 32. Compressor outlet housing 20 includes outlet duct 34 and outlet 36. Air cycle machine 10 further includes journal bearing 70, rotating shaft 72, and bleed holes 74. FIG. 1 also shows axis A.

Compressor section 12 and turbine section 14 are mounted on tie rod 16. Tie rod 16 is configured to rotate about axis A. Compressor inlet housing 18 and compressor outlet housing 20 of compressor section 12 are connected to one another. Diffuser 24 is positioned between compressor inlet housing 18 and compressor outlet housing 20. Mixed-flow rotor 26 is positioned between compressor inlet housing 18 and compressor outlet housing 20. Mixed-flow rotor 26 is mounted on tie rod 16, which rotatably connects mixed-flow rotor 26 and turbine section 14. Rotor shroud 28 is positioned radially outward from and partially surrounds mixed-flow rotor 26.

Compressor inlet housing 18 includes inlet 30 and inlet duct 32. Inlet 30 is positioned at a first end of compressor inlet housing 18. Inlet duct 32 extends from inlet 30 through compressor inlet housing 18 to mixed-flow rotor 26. Compressor outlet housing 20 includes outlet duct 34 and outlet 36. Outlet duct 34 extends through compressor outlet housing 20 from mixed-flow rotor 26 to outlet 36. Diffuser 24 is positioned fluidically between mixed-flow rotor 26 and outlet 36.

Turbine section 14 includes turbine shroud 22 and turbine 60. Turbine 60 is mounted to tie rod 16 to drive rotation of tie rod 16. Turbine 60 drives rotation of tie rod 16 and rotating shaft 72 in air cycle machine 10, which rotates mixed-flow rotor 26. The rotation of mixed-flow rotor 26 draws air into inlet 30 of compressor inlet housing 18 to produce the core flow. The core flow passes through inlet duct 32 to mixed-flow rotor 26 and is compressed by mixed-flow rotor 26. The compressed core flow is then routed through diffuser 16 and into outlet duct 34 of compressor outlet housing 20. The core flow then exits air cycle machine 10 through outlet 36 of compressor outlet housing 20.

Air cycle machine 10 further includes journal bearing 70, rotating shaft 72, and bleed holes 74. Journal bearing 70 is positioned in compressor section 12 and is supported by compressor outlet housing 20. Turbine 60 drives rotation of rotating shaft 72. Some core flow through turbine section 14 may be diverted to a bleed flow path B through bleed holes 74 on rotating shaft 72. This bleed flow path B is a path for cooling bearing air. A portion of the cooling bearing air in bleed flow path B is used for bearing cooling purposes while the remainder is directed to mixed-flow rotor 26 and becomes rotor flow R (shown in FIG. 4.) Mixed-flow rotor 26 is discussed in greater detail below with reference to FIGS. 2-4.

Figure 2:
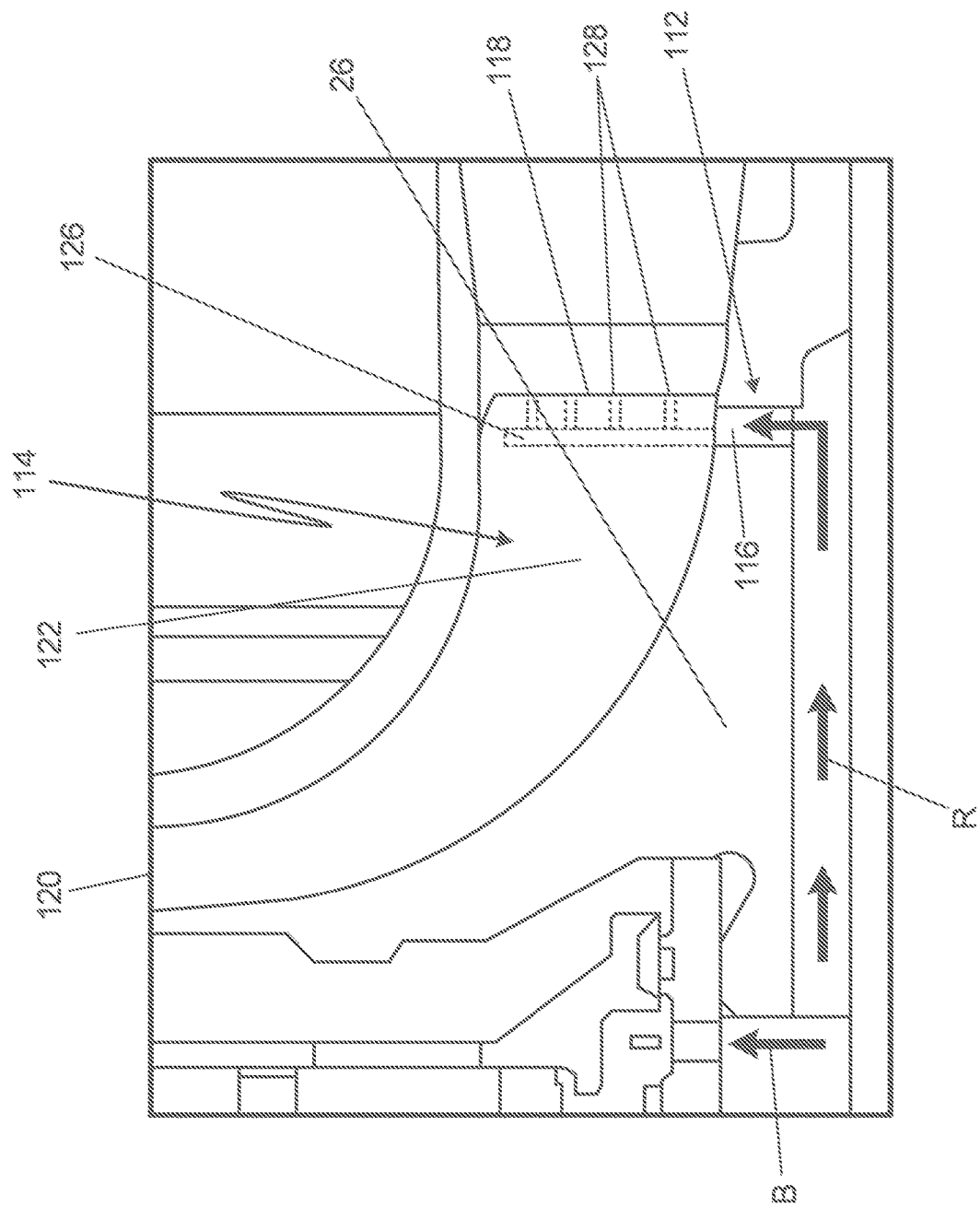
FIG. 2 is an enlarged cross-sectional view of a mixed-flow rotor of the air cycle machine from FIG. 1.
Figure 3:
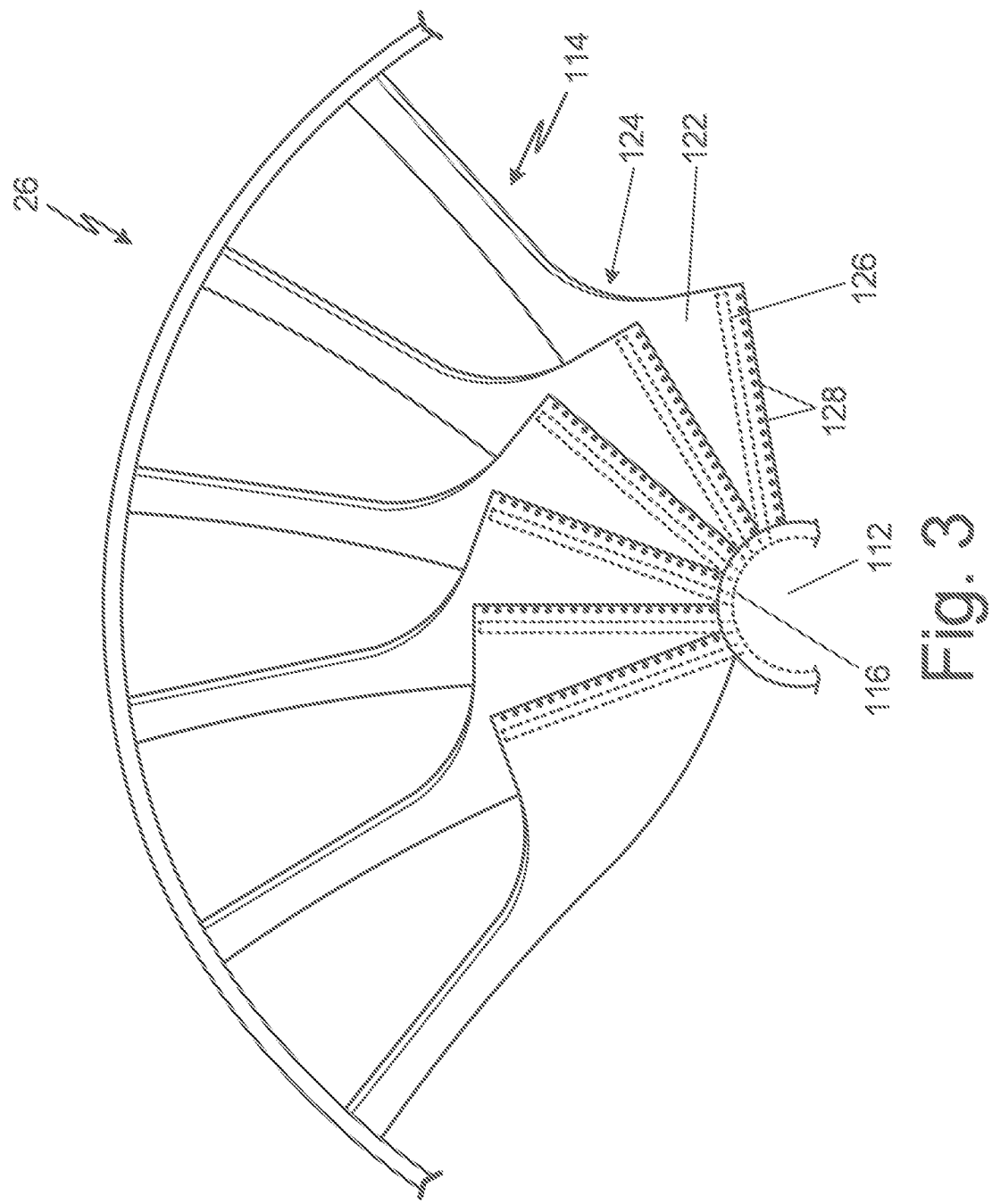
FIG. 3 is a perspective view of a mixed-flow rotor with a blade with an internal channel and air outlets.

FIGS. 2 and 3 will be discussed concurrently. FIG. 2 is an enlarged cross-sectional view of mixed-flow rotor 26. FIG. 3 is a perspective view of mixed-flow rotor 26 from FIG. 2. As shown in FIGS. 2 and 3, mixed-flow rotor 26 includes rotor hub 112 and blades 114. Rotor hub 112 includes interior flow passage 116. Interior flow passage 116 extends axially through rotor hub 112 and fluidically connects rotor flow R from bleed flow path B to internal channel 126. Each of blades 114 includes leading edge 118, trailing edge 120, pressure surface 122, suction surface 124, internal channel 126 and air outlets 128.

Mixed-flow rotor 26, as shown in FIGS. 2 and 3, is an impeller with each blade 114 transitioning from an axial flow path at leading edge 118 to a radial flow path at trailing edge 120. Trailing edge 120 is downstream and opposite from leading edge 118 relative core flow F through compressor 10. Pressure surface 122 extends from leading edge 118 to trailing edge 120. Suction surface 124 extends from leading edge 118 to trailing edge 120 opposite pressure surface 122.

Figure 4:
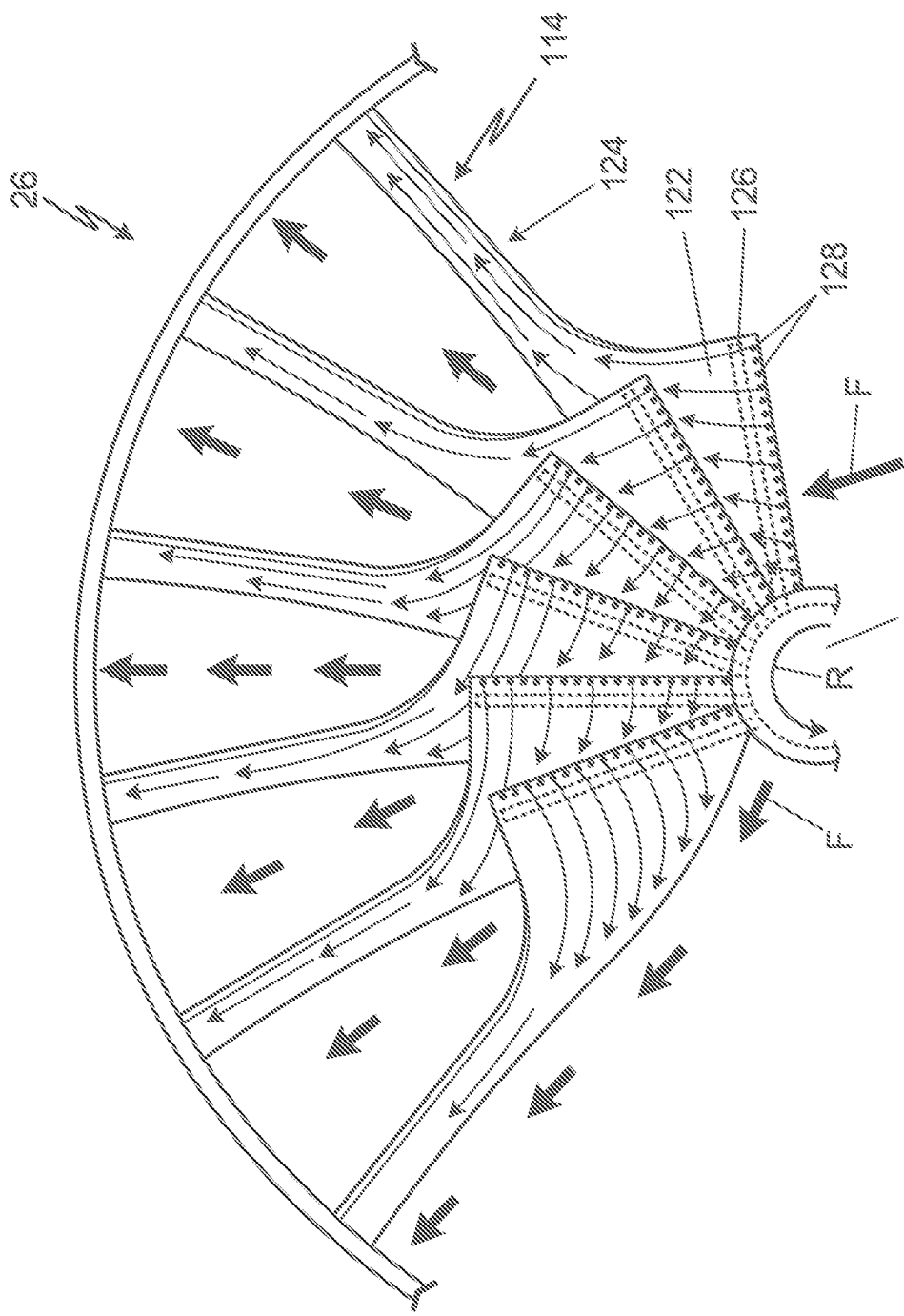
FIG. 4 is a perspective view of the mixed-flow rotor from FIG. 3 with a rotor flow exiting the air outlets and a core flow over the mixed-flow rotor and the rotor flow.

Each blade 114 includes internal channel 126 and air outlets 128. Internal channel 126 is formed inside of blade 114 between pressure surface 122 and suction surface 124. Internal channel 126 extends radially within blade 114 and is in fluidic connection with interior flow passage 116. Internal channel 126 in each blade 114 can extend radially through rotor hub 112 to fluidically connect with interior flow passage 116. On each blade 114, air outlets 128 are formed proximate leading edge 118 and extend into blade 114 to fluidically connect with internal channel 126. In FIGS. 2-4, air outlets 128 are evenly spaced from one another. In another embodiment, they may be irregularly spaced from one another. As discussed below with reference to FIG. 4, air outlets 128 increase the efficiency of blade 114 by delaying the separation of the boundary layer of core flow passing over blade 114.

FIG. 4 is a perspective view of mixed-flow rotor 26 with blade 114 with internal channel 126 and air outlets 128 along with core flow F traversing mixed-flow rotor 26. As mixed-flow rotor 26 rotates and core flow F enters mixed-flow rotor 126, core flow F flows axially, turns, and then flows radially along blades 114. Rotor flow R simultaneously flows through rotor hub 112 via interior flow passage 116 (shown in FIGS. 2 and 3). Rotor flow R then flows through internal channel 126 (shown in FIG. 3) of each blade 114, and exits blade 114 through air outlets 128. Rotor flow R, after exiting blade 114 through air outlets 128, becomes discharged air DA which will then entrain core flow F through the Coanda effect, delaying separation of core flow F around blade 114, which increases efficiency of mixed-flow rotor 26.

Figure 5:
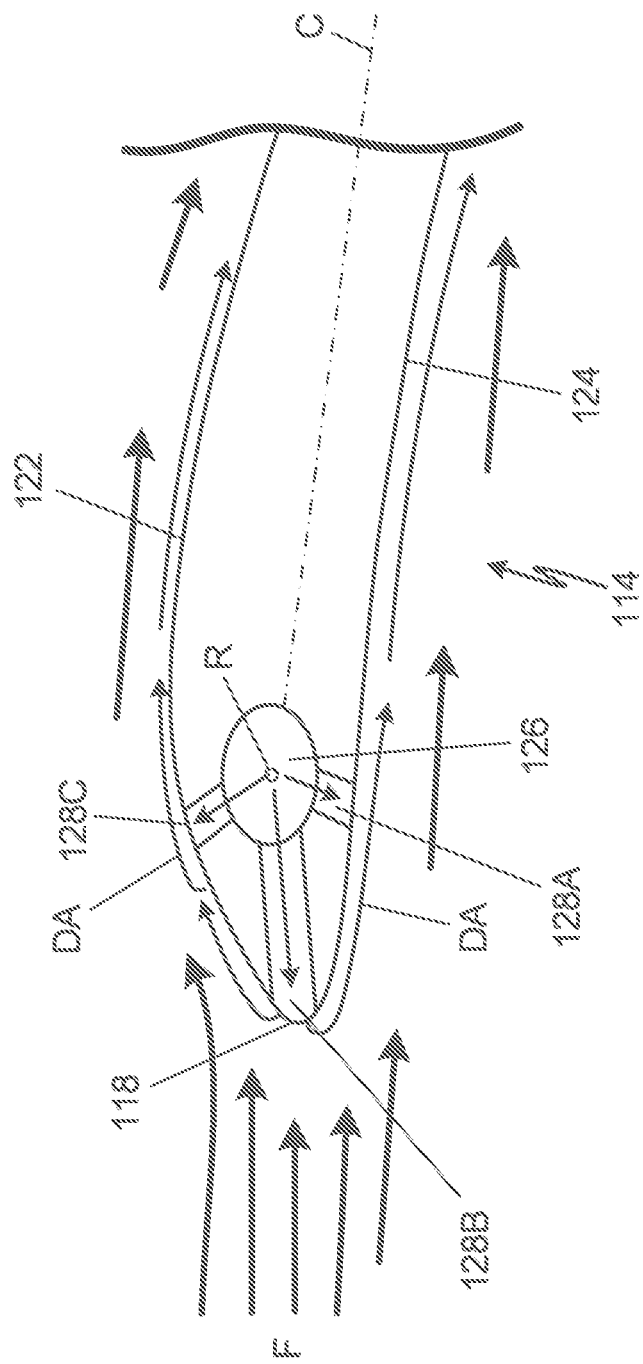
FIG. 5 is a cross-sectional view of another embodiment of a rotor blade with an internal channel and air outlets proximate to a leading edge of the rotor blade.

FIG. 5 is a cross-sectional view of another embodiment of blade 114 with internal channel 126 and air outlets 128 proximate to the leading edge. Air outlet 128a can be formed proximate to leading edge 118 within fifteen percent of chord C on suction surface 124. Air outlet 128b can be formed on leading edge 118. Air outlet 128c can be formed proximate to leading edge 118 within fifteen percent of chord C on pressure surface 122. In other embodiments, air outlets 128 can be formed only on leading edge 118 or only within fifteen percent of chord C on either pressure surface 122 or suction surface 124. Air outlets 128 can also be formed in any combination of leading edge 118 and within fifteen percent of chord C on pressure surface 122 or suction surface 124. Rotor flow R flows through internal channel 126 and is discharged through air outlets 128 becoming discharged air DA. The location of air outlets 128 determines the direction of discharged air DA. Discharged air DA emerging from air outlets 128 will tend to follow an adjacent surface due to the Coanda effect. Discharged air DA from air outlet 128a will follow suction surface 124, discharged air DA from air outlet 128c will follow pressure surface 122, and discharged air DA from air outlet 128b will follow pressure surface 122 and suction surface 124. Core flow F meets blade 114 at leading edge 118 and can then flow along pressure surface 122 and suction surface 124. Discharged air DA follows pressure surface 122 and suction surface 124; when core flow F reaches pressure surface 122 and suction surface 124 core flow F will be entrained by discharged air DA. Core flow F being entrained by discharged air DA delays the separation of core flow F from body 128, keeping core flow F laminar for longer than core flow F would remain laminar in the absence of discharged air DA. Laminar flow along body 128 is more efficient than turbulent flow, and discharged air DA entraining core flow F increases the efficiency of mixed-flow rotor 26. Controlling the direction of discharged air DA via spacing and profile of air outlets 128 can change the efficiency of mixed-flow rotor 26.

FIG. 6 is a perspective view of blade 114 showing exemplary orientations of air outlets 128. In the embodiment of FIG. 6, air outlets 128 can be irregularly spaced on leading edge 118. Air outlets 128 can also include circular, elliptical, and/or non-circular profiles. The spacing, profile, and direction of air outlets 128 can be chosen to increase the efficiency of mixed-flow rotor 26 through delaying the separation of air around blade 114. Blade 114 can be additive manufactured to allow for the creation of inner channel 126 and air outlets 128.

Discussion of Possible Embodiments

The following are non-exclusive descriptions of possible embodiments of the present invention.

In one embodiment, a compressor includes a housing and a mixed-flow rotor mounted within the housing. The mixed-flow rotor includes a blade and a rotor hub with an interior flow passage. The blade includes a leading edge extending in a radial direction, trailing edge extending in an axial direction, a pressure surface extending from the leading edge to the trailing edge, and a suction surface extending from the leading edge to the trailing edge opposite the pressure surface. The blade also includes an internal channel inside the blade between the pressure surface and the suction surface. The internal channel extends radially within the blade and is in fluidic communication with the interior flow passage. The blade also includes a plurality of air outlets formed on the blade proximate the leading edge. The plurality of air outlets extends into the blade to fluidically connect with the internal channel.

The compressor of the preceding paragraph can optionally include, additionally and/or alternatively, any one or more of the following features, configurations and/or additional components:

A further embodiment of the foregoing compressor further including a bearing assembly supporting the mixed-flow rotor; and a cooling flow passage extending across the bearing assembly and configured to cool the bearing assembly, where the interior flow passage of the rotor hub includes an inlet fluidically connected to the cooling flow passage.

A further embodiment of any of the foregoing compressors, wherein at least one air outlet of the plurality of air outlets comprises a circular profile.

A further embodiment of any of the foregoing compressors, wherein at least one air outlet of the plurality of air outlets comprises an elliptical profile.

A further embodiment of any of the foregoing compressors, wherein the plurality of air outlets is evenly spaced on the leading edge.

A further embodiment of any of the foregoing compressors, wherein the plurality of air outlets is irregularly spaced on the leading edge.

A further embodiment of any of the foregoing compressors, wherein at least one air outlet of the plurality of air outlets is on the leading edge.

A further embodiment of any of the foregoing compressors, wherein at least one air outlet of the plurality of air outlets extends from the internal channel to the pressure surface within fifteen percent of chord from the leading edge.

A further embodiment of any of the foregoing compressors, wherein at least one air outlet of the plurality of air outlets extends from the internal channel to the suction surface within fifteen percent of chord from the trailing edge.

A further embodiment of any of the foregoing compressors, wherein the plurality of air outlets includes a first air outlet on the leading edge and extending to the internal channel, a second air outlet on the suction surface within fifteen percent of chord from the leading edge and extending to the internal channel, and a third air outlet on the pressure surface within fifteen percent of chord from the leading edge and extending to the internal channel.

A further embodiment of any of the foregoing compressors, wherein the internal channel is of a greater diameter than each air outlet of the plurality of air outlets.

In another embodiment, an impeller includes a rotor hub with an interior flow passage and a blade. The blade includes a leading edge extending in a radial direction, trailing edge extending in an axial direction, a pressure surface extending from the leading edge to the trailing edge, and a suction surface extending from the leading edge to the trailing edge opposite the pressure surface. The blade also includes an internal channel inside of the blade between the pressure surface and the suction surface. The internal channel extends radially within the blade. The blade also includes a plurality of air outlets formed on the blade proximate the leading edge. The plurality of air outlets extends into the blade to fluidically connect with the internal channel.

The impeller of the preceding paragraph can optionally include, additionally and/or alternatively, any one or more of the following features, configurations and/or additional components:

A further embodiment of the foregoing impeller, wherein at least one air outlet of the plurality of air outlets comprises a circular profile or an elliptical profile.

A further embodiment of any of the foregoing impellers, wherein the plurality of air outlets is evenly spaced on the leading edge.

A further embodiment of any of the foregoing impellers, wherein the plurality of air outlets is irregularly spaced on the on the leading edge.

A further embodiment of any of the foregoing impellers, wherein at least one air outlet of the plurality of air outlets is on the leading edge.

A further embodiment of any of the foregoing impellers, wherein at least one air outlet of the plurality of air outlets extends from the internal channel to the pressure surface within fifteen percent of chord from the leading edge.

A further embodiment of any of the foregoing impellers, wherein at least one air outlet of the plurality of air outlets extends from the internal channel to the suction surface within fifteen percent of chord from the trailing edge.

A further embodiment of any of the foregoing impellers, wherein the plurality of air outlets includes a first air outlet on the leading edge and extending to the internal channel, a second air outlet on the suction surface within fifteen percent of chord from the leading edge and extending to the internal channel, and a third air outlet on the pressure surface within fifteen percent of chord from the leading edge and extending to the internal channel.

In another embodiment, a method of manufacturing a mixed-flow rotor includes additively manufacturing a rotor. The rotor includes a blade and a rotor hub with an interior flow passage. The blade includes a leading edge extending in a radial direction, a trailing edge extending in an axial direction, a pressure surface extending from the leading edge to the trailing edge, and a suction surface extending from the leading edge to the trailing edge opposite the pressure surface. The blade further includes an internal channel inside the blade between the pressure surface and the suction surface. The internal channel extends radially within the blade and is in fluidic communication with the interior flow passage. The blade also includes a plurality of air outlets formed on the blade proximate the leading edge. The plurality of air outlets extends into the blade to fluidically connect with the internal channel.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A compressor of an air cycle machine, wherein the compressor comprises:
   a housing forming an inlet of the air cycle machine; and
   a centrifugal rotor mounted within the housing, the centrifugal rotor comprising:
      a rotor hub comprising an interior flow passage;
      a blade comprising a leading edge extending in a radial direction, a trailing edge extending in an axial direction, a pressure surface extending from the leading edge to the trailing edge, and a suction surface extending from the leading edge to the trailing edge opposite the pressure surface;

an internal channel inside of the blade between the pressure surface and the suction surface and extending radially within the blade and in fluidic communication with the interior flow passage; and a plurality of air outlets formed on the blade proximate the leading edge and extending into the blade to fluidically connect with the internal channel, wherein at least one air outlet of the plurality of air outlets is on the leading edge.

2. The compressor of claim 1, further comprising:

a bearing assembly supporting the centrifugal rotor; and a cooling flow passage extending across the bearing assembly and configured to cool the bearing assembly, wherein the interior flow passage of the rotor hub comprises an inlet fluidically connected to the cooling flow passage.

3. The compressor of claim 1, wherein at least one air outlet of the plurality air outlets comprises a circular profile.

4. The compressor of claim 1, wherein at least one air outlet of the plurality of air outlets comprises an elliptical profile.

5. The compressor of claim 1, wherein the plurality of air outlets is evenly spaced on the leading edge.

6. The compressor of claim 1, wherein the plurality of air outlets is irregularly spaced on the leading edge.

7. The compressor of claim 1, wherein at least one air outlet of the plurality of air outlets extends from the internal channel to the pressure surface within fifteen percent of chord from the leading edge.

8. The compressor of claim 1, wherein at least one air outlet of the plurality of air outlets extends from the internal channel to the suction surface within fifteen percent of chord from the leading edge.

9. The compressor of claim 1, wherein the plurality of air outlets comprises:

a first air outlet on the leading edge and extending to the internal channel;

a second air outlet on the suction surface within fifteen percent of chord from the leading edge and extending to the internal channel; and a third air outlet on the pressure surface within fifteen percent of chord from the leading edge and extending to the internal channel.

10. The compressor of claim 1, wherein the internal channel is of a greater diameter than each air outlet of the plurality of air outlets.

11. An impeller of an air cycle machine, the impeller comprising:

a rotor hub comprising an interior flow passage;

a blade comprising a leading edge extending in a radial direction, a trailing edge extending in an axial direction, a pressure surface extending from the leading edge to the trailing edge, and a suction surface extending from the leading edge to the trailing edge opposite the pressure surface;

an internal channel inside of the blade between the pressure surface and the suction surface and extending radially within the blade; and a plurality of air outlets formed on the blade proximate the leading edge and extending into the blade and fluidically connecting with the internal channel, wherein at least one air outlet of the plurality of air outlets is on the leading edge.

12. The impeller of claim 11, wherein at least one air outlet of the plurality of air outlets comprises a circular profile or an elliptical profile.

13. The impeller of claim 11, wherein the plurality of air outlets is evenly spaced on the leading edge.

14. The impeller of claim 11, wherein the plurality of air outlets is irregularly spaced on the leading edge.

15. The impeller of claim 11, wherein at least one air outlet of the plurality of air outlets is on the leading edge.

16. The impeller of claim 11, wherein at least one air outlet of the plurality of air outlets extends from the internal channel to the pressure surface within fifteen percent of chord from the leading edge.

17. The impeller of claim 11, wherein at least one air outlet of the plurality of air outlets extends from the internal channel to the suction surface within fifteen percent of chord from the leading edge.

18. The impeller of claim 11, wherein the plurality of air outlets comprises:

a first air outlet on the leading edge and extending to the internal channel;

a second air outlet on the suction surface within fifteen percent of chord from the leading edge and extending to the internal channel; and a third air outlet on the pressure surface within fifteen percent of chord from the leading edge and extending to the internal channel.

19. A method of manufacturing a mixed-flow rotor of an air cycle machine, the method comprising:

additively manufacturing a rotor, the rotor comprising:

a rotor hub comprising an interior flow passage;

a blade comprising a leading edge extending in a radial direction, a trailing edge extending in an axial direction, a pressure surface extending from the leading edge to the trailing edge, and a suction surface extending from the leading edge to the trailing edge opposite the pressure surface;

an internal channel inside the blade between the pressure surface and the suction surface and extending radially within the blade and in fluidic communication with the interior flow passage; and a plurality of air outlets formed on the blade proximate the leading edge and extending into the blade to fluidically connect with the internal channel, wherein at least one air outlet of the plurality of air outlets is on the leading edge.

* * * * *